United States Patent
Sugawara et al.

(10) Patent No.: US 9,240,727 B2
(45) Date of Patent: Jan. 19, 2016

(54) SWITCHING POWER SUPPLY DEVICE CONTROL CIRCUIT HAVING AN OVERCURRENT PROTECTION CONTROL CIRCUIT

(71) Applicant: FUJI ELECTRIC CO., LTD., Kawasaki (JP)

(72) Inventors: Takato Sugawara, Matsumoto (JP); Hiroki Yamane, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 206 days.

(21) Appl. No.: 14/058,888

(22) Filed: Oct. 21, 2013

(65) Prior Publication Data
US 2014/0043867 A1 Feb. 13, 2014

Related U.S. Application Data

(63) Continuation of application No. PCT/JP2012/063170, filed on May 23, 2012.

(30) Foreign Application Priority Data

Jul. 12, 2011 (JP) .................................. 2011-154075

(51) Int. Cl.
*H02M 3/335* (2006.01)
*H02H 9/02* (2006.01)
*H02M 1/00* (2007.01)

(52) U.S. Cl.
CPC ...... *H02M 3/33523* (2013.01); *H02M 3/33507* (2013.01); *H02H 9/025* (2013.01); *H02M 2001/0025* (2013.01)

(58) Field of Classification Search
CPC ........... H02M 1/08; H02M 1/32; H02M 1/36; H02M 3/33507; H02M 3/33523; H02M 2001/0025; H02H 3/006; H02H 9/025
USPC .............. 363/15, 16, 20, 21.01, 21.07, 21.08, 363/21.09, 21.1, 21.11, 21.12, 21.15, 21.16, 363/21.17, 21.18, 55, 56.01, 56.09, 56.1, 363/97, 131; 361/18
See application file for complete search history.

(56) References Cited

U.S. PATENT DOCUMENTS

| | | | |
|---|---|---|---|
| 6,914,789 B2 * | 7/2005 | Kinoshita | ......... H02M 3/33507 363/21.12 |
| 7,099,163 B1 | 8/2006 | Ying | |

(Continued)

FOREIGN PATENT DOCUMENTS

| | | |
|---|---|---|
| JP | 4-299061 | 10/1992 |
| JP | 5-308774 | 11/1993 |

(Continued)

OTHER PUBLICATIONS

International Search Report mailed Aug. 28, 2012 in corresponding International Application No. PCT/JP2012/063170.

*Primary Examiner* — Adolf Berhane
*Assistant Examiner* — Jye-June Lee

(57) ABSTRACT

A switching power supply device control circuit and switching power supply can combat fluctuation due to the input voltage in the peak current of a switching element, even when using an oscillator. A control IC is connected to a switching element and to a current detecting resistor, and controls the switching element, the control IC being configured of an OCP comparator that detects an overcurrent with respect to a load, an overcurrent level setting circuit that corrects a fluctuation occurring in the peak current of the switching element in response to the output voltage from the AC input, an oscillator having a frequency modulating function whereby the switching frequency with respect to the switching element can be modulated, and a slope compensation circuit that generates a slope compensation signal increasing monotonically in proportion to the time from the start of each cycle of an oscillating signal of the oscillator.

6 Claims, 13 Drawing Sheets

(56) References Cited

U.S. PATENT DOCUMENTS

| | | | |
|---|---|---|---|
| 7,345,895 B2 * | 3/2008 | Zhu | H02M 3/33507 363/21.12 |
| 7,535,736 B2 * | 5/2009 | Nakamura | H02M 1/32 363/21.15 |
| 7,567,070 B2 | 7/2009 | Djenguerian et al. | |
| 7,592,790 B2 | 9/2009 | Yang | |
| 7,616,454 B2 | 11/2009 | Yang | |
| 7,616,461 B2 | 11/2009 | Yang et al. | |
| 2007/0019343 A1 | 1/2007 | Barbehenn et al. | |
| 2007/0183171 A1 | 8/2007 | Niijima | |
| 2007/0291516 A1 | 12/2007 | Nakamura et al. | |
| 2008/0291700 A1 * | 11/2008 | Huang | H02M 1/32 363/21.1 |
| 2008/0291701 A1 | 11/2008 | Lin | |
| 2009/0021233 A1 | 1/2009 | Hsu | |
| 2009/0103335 A1 | 4/2009 | Nakamura | |
| 2013/0135775 A1 * | 5/2013 | Yao | H02H 9/025 361/18 |
| 2014/0078792 A1 * | 3/2014 | Yabuzaki | H02M 1/32 363/53 |
| 2014/0104894 A1 * | 4/2014 | Yamane | H02M 3/33523 363/21.13 |

FOREIGN PATENT DOCUMENTS

| | | |
|---|---|---|
| JP | 5-344712 | 12/1993 |
| JP | 6-217533 | 8/1994 |
| JP | 2002-153047 | 5/2002 |
| JP | 2004-40856 | 2/2004 |
| JP | 2005-184882 | 7/2005 |
| JP | 2007-215253 | 8/2007 |
| JP | 2008-5567 | 1/2008 |
| JP | 2009-106038 | 5/2009 |
| JP | 2010-245675 | 10/2010 |
| JP | 2011-91888 | 5/2011 |

* cited by examiner

SWITCH SIGNAL Sout

VOLTAGE SIGNAL Sb IN OSC 34

Dmax SIGNAL

OUTPUT SIGNAL Sa FROM SLOPE COMPENSATION CIRCUIT 35

OUTPUT SIGNAL SD FROM OVERCURRENT LEVEL SETTING CIRCUIT 50

SLOPE COMPENSATION CIRCUIT 35 SIGNAL WAVEFORMS

WHEN AC INPUT VOLTAGE IS LOW

WHEN AC INPUT VOLTAGE IS HIGH (A) SWITCH SIGNAL Sout (B) VOLTAGE SIGNAL Sb (C) Dmax SIGNAL (D) OCP COMPARATOR 45 OUTPUT SIGNAL

SWITCHING POWER SUPPLY DEVICE CONTROL CIRCUIT HAVING AN OVERCURRENT PROTECTION CONTROL CIRCUIT

CROSS-REFERENCE TO RELATED APPLICATIONS

This application is a continuation application, filed under 35 U.S.C. §111(a), of International Application PCT/JP2012/063170 filed on May 23, 2012, and claims foreign priority benefit of Japanese Patent Application 2011-154075 filed on Jul. 12, 2011 in the Japanese Patent Office, the disclosures of both of which are incorporated herein by reference.

BACKGROUND

1. Field

Embodiments of the present invention relate to a control circuit and switching power supply of a flyback type switching power supply device that converts the voltage of an AC input that turns a switching element on and off into a predetermined direct current voltage and supplies the voltage to a load, and in particular, relate to a control circuit and switching power supply of a switching power supply device that can combat fluctuation due to the voltage value of the AC input in an overcurrent peak current flowing through the switching element.

2. Description of the Related Art

FIG. 5 shows a circuit configuration of a flyback power supply using a PWM controlling integrated circuit (IC).

An AC input 1 is supplied via a transformer 2 and capacitor 3 configuring an input filter to a diode bridge 4, and rectified to a direct current input voltage. A capacitor 5 is provided between the diode bridge 4 and a ground, and has a function of absorbing switching noise. Also, a diode 6 supplies the half-wave rectified AC input 1 via a current limiting resistor 7 to a VH terminal of a control IC 8. Current input into the VH terminal is limited by the current limiting resistor 7.

A thermistor 9 for carrying out heated latch protection of the control IC 8 is connected to an LAT terminal of the control IC 8. Also, the voltage of a sense resistor 12 is input via a noise filter formed of a capacitor 10 and resistor 11 into an IS terminal of the control IC 8. A VCC terminal of the control IC 8 is connected to one end of a capacitor 13, and is connected via a backflow preventing diode 14 to an auxiliary winding 15 of a transformer T. The capacitor 13 holds a power supply voltage supplied to the control IC 8 when a PWM control operation is carried out. Also, the backflow preventing diode 14 acts so as to prevent a backflow of current from the VCC terminal to the auxiliary winding 15.

One end of a primary winding 16 of the transformer T is connected to the capacitor 5, while the other end is connected to the drain terminal of a MOSFET 17. Also, the source terminal of the MOSFET 17 is earthed via the sense resistor 12, and a drain current Ids flowing through the MOSFET 17 is detected by the sense resistor 12. That is, an on-state current of the MOSFET 17 is converted in the sense resistor 12 into a voltage signal of a size proportional to the on-state current, and the voltage signal is supplied via the noise filter to the IS terminal of the control IC 8.

One end of a secondary winding 18 of the transformer T is connected to a diode 19, and also earthed via a capacitor 20. The voltage of the capacitor 20 is sent from the secondary side to the primary side by a photocoupler 21 as information relating to the output voltage supplied to a load 25. That is, the photocoupler 21 is connected in series to a shunt regulator 22, a connection point of resistors 23 and 24 that divide the output voltage is connected to the shunt regulator 22, and the divided output voltage value and an unshown reference voltage are compared by the shunt regulator 22. As a result of this, information on an error in the secondary side output voltage with respect to the reference voltage is converted into a current signal, and load information is sent to the primary side by the current signal driving the photocoupler 21.

In a switching power supply device configured using the PWM controlling control IC 8, the rectified AC input voltage is converted via the transformer T into a predetermined DC voltage by a switching operation of the MOSFET 17 being controlled. In the control IC 8 configured of an IC circuit, load information output to the load 25 on the secondary side of the transformer T is fed back to an FB terminal of the control IC 8 via the shunt regulator 22 and photocoupler 21, as heretofore described, and detected. Also, the voltage of the MOSFET 17 drain current is converted in the sense resistor 12, and the voltage is detected by the IS terminal of the control IC 8. By the FB terminal voltage and IS terminal voltage being compared, and the on-state duration of the MOSFET 17 being variably controlled from an OUT terminal, it is possible to perform the PWM control of the switching power supply device, and thus possible to regulate the power supplied to the secondary side load 25.

FIG. 6 is a block diagram showing an internal circuit configuration of a related PWM controlling control IC.

A start-up circuit (Startup) 31 supplies current from the VH terminal to the VCC terminal when starting up, and on the AC input 1 being applied to the flyback power supply, current flows in the control IC 8 from the VH terminal via the start-up circuit 31 to the VCC terminal. Because of this, the capacitor 13, which is externally connected to the VCC terminal, is charged, and the voltage value thereof rises.

A low voltage malfunction prevention circuit (UVLO) 32 is connected to the VCC terminal and a reference power supply V1. The low voltage malfunction prevention circuit 32 is such that a UVLO signal, which is the output of the low voltage malfunction prevention circuit 32, changes to an L (Low) level on the voltage value of the VCC terminal rising to or above the reference power supply V1, an internal power supply (5VReg.) 33 starts up, and a supply of power to each circuit in the control IC 8 is carried out, while conversely, the UVLO signal is at an H (High) level while the VCC terminal voltage is low, stopping the operation of the control IC 8.

An oscillator (OSC) 34 is connected to the FB terminal, and a frequency modulation function is incorporated therein in order to reduce EMI (electromagnetic interference) noise generated by a switching operation of the MOSFET 17. The oscillator 34 determines the switching frequency of the MOSFET 17 according to the control IC 8, also has a function, separate from the heretofore described frequency modulation function, of lowering the oscillation frequency when there is a light load, and outputs an oscillating signal (a maximum duty cycle signal) Dmax. The oscillating signal Dmax is a signal with a long H level time that changes to an L level for a short time in every cycle, the cycle thereof is the switching cycle of the switching power supply, and the ratio between the cycle and the time of the H level during the cycle provides a maximum time ratio (maximum duty cycle) of the switching power supply. Also, a slope compensation circuit 35 is connected to the IS terminal, and includes a function of preventing sub-harmonic oscillation, of a kind to be described hereafter.

An FB comparator 36 is connected to the FB terminal and a reference power supply V2. When the FB terminal voltage falls below the reference power supply V2, it is determined that the output voltage is excessive, and a clear signal CLR is output from the FB comparator 36 to a one-shot circuit 37 of a subsequent stage, stopping the switching operation. The one-shot circuit 37 is triggered by the rise of the oscillating signal Dmax of the oscillator 34, and generates a set pulse for an RS flip-flop 38 of a subsequent stage. Also, while the H level clear signal CLR is being input, the one-shot circuit 37 does not output a set pulse for the RS flip-flop 38.

The RS flip-flop 38, together with an OR gate 39 and an AND gate 40, forms a PWM signal. That is, a blanking signal, which is a sum (OR) signal of two input output signals—the output signals of the one-shot circuit 37 and RS flip-flop 38—is generated in the OR gate 39. Basically, the blanking signal forms the PWM signal, but furthermore, the maximum duty cycle of the PWM signal is determined in the AND gate 40 based on the oscillating signal Dmax of the oscillator 34.

The UVLO signal output from the low voltage malfunction prevention circuit 32 is supplied via an OR gate 41 to a drive circuit (OUTPUT) 42, and the gate of the MOSFET 17 is on/off controlled by a switch signal Sout output via the OUT terminal from the drive circuit 42. That is, when the VCC terminal voltage is low and the UVLO signal is at an H level, the output of the drive circuit 42 is turned off (a signal causing the MOSFET 17 to be turned off is output). Conversely, when the VCC terminal voltage is high and the UVLO signal is at an L level, the drive circuit 42 on/off controls the gate of the MOSFET 17 in accordance with the output signal of the AND gate 40.

A level shift (Level Shift) circuit 43 has a function of shifting the level of the FB terminal voltage to a voltage range that can be input into an IS comparator 44, and the output signal of the level shift (Level Shift) circuit 43 is supplied to the inversion input terminal (−) of the IS comparator 44. The output signal of the slope compensation circuit 35 is supplied to the non-inversion input terminal (+) of the IS comparator 44. A power supply voltage Vcc is connected via a resistor R0 to the FB terminal, and the resistance R0 is the load resistance of a phototransistor configuring the photocoupler 21. Because of this, the size of the load 25 connected to the switching power supply device is detected from the drop in voltage from the power supply voltage Vcc according to the resistance R0.

The slope-compensated IS terminal voltage and the level-shifted FB terminal voltage are compared in the IS comparator 44, thus determining the timing at which the MOSFET 17 is turned off. Also, an OCP comparator 45 that determines the overcurrent protection level of the MOSFET 17 is connected to the IS terminal of the control IC 8. The non-inversion input terminal (+) of the OCP comparator 45 is connected to the IS terminal and the inversion input terminal (−) is connected to a reference power supply V3, respectively, and the OCP comparator 45 determines the overcurrent protection level of the MOSFET 17. Further, an off-state signal from the IS comparator 44 and an off-state signal from the OCP comparator 45 are both supplied via an OR gate 46 to the reset terminal of the RS flip-flop 38.

Current from a current source 47 is supplied via the LAT terminal to the thermistor 9. An LAT comparator 48 is connected to the LAT terminal and a reference power supply V4 and, on detecting that the voltage of the LAT terminal (that is, the voltage of the thermistor 9) has fallen to or below the voltage of the reference power supply V4, determines that there is a heated condition, and outputs a set signal to a latch circuit 49. The latch circuit 49 receives the set signal of the LAT comparator 48, and outputs an H level latch signal Latch to the OR gate 41 and an OR gate 51. Because of this, the drive circuit 42 and start-up circuit 31 are turned off. Also, the UVLO signal of the low voltage malfunction prevention circuit 32 is supplied to the reset terminal of the latch circuit 49, and a latching condition is deactivated when the potential of the VCC terminal falls.

On the internal power supply 33 starting up and power being supplied to the internal circuit, voltage is applied via the resistor R0 and FB terminal to the phototransistor configuring the photocoupler 21, and the FB terminal voltage rises. On the FB terminal voltage signal rising to or above a constant voltage value, the oscillating signal Dmax is output from the oscillator 34, and a set pulse is output from the one-shot circuit 37 to the RS flip-flop 38, triggered by the rise of the oscillating signal Dmax. The set pulse is input into the OR gate 39 together with the output signal of the RS flip-flop 38, and a blanking signal is generated as heretofore described. Further, this signal is output as a PWM signal from the OUT terminal, via the AND gate 40 and drive circuit 42, to the gate terminal of the MOSFET 17, becoming the switch signal Sout and driving the MOSFET 17. Because of this, the MOSFET 17 is turned on at the rise of the oscillating signal Dmax. Taking the sum (OR) of the output signal of the RS flip-flop 38 and the set pulse from the one-shot circuit 37 is done so that, even in a condition wherein the RS flip-flop 38 is left reset for some reason, the MOSFET 17 is turned on for the duration of the set pulse from the one-shot circuit 37. As the drain current Ids flows through the sense resistor 12 when the MOSFET 17 is turned on, the voltage of the IS terminal of the control IC 8 rises.

Further, on the slope-compensated IS terminal voltage of the control IC 8 reaching a voltage which is the FB terminal voltage level-shifted by the level shift circuit 43, a reset signal is output from the IS comparator 44 to the RS flip-flop 38 via the OR gate 46. By the RS flip-flop 38 being reset, the output of the OR gate 39 changes to an L level (during normal operation, the set pulse from the one-shot circuit 37 is at an L level at this point), and as the output of the AND gate 40 also changes to an L level in response, the MOSFET 17 is turned off by the switch signal Sout.

Also, even in the event that the load 25 connected to the switching power supply device becomes extremely heavy, and the voltage value fed back to the FB terminal of the control IC 8 is outside the (high voltage side) control range, it is possible, by comparing the voltage value of the IS terminal with the constant reference voltage value V3 using the OCP comparator 45, to turn off the MOSFET 17 when the voltage value of the IS terminal is equal to or higher than the reference voltage value V3.

Before the level-shifted FB terminal voltage is compared with the IS terminal voltage in the IS comparator 44, slope compensation whereby a slope compensation voltage proportional to the on-state duration of the MOSFET 17 is added is carried out on the IS terminal voltage by the slope compensation circuit 35. Generally, provided that the MOSFET 17 is operating in a steady state, the sizes of the current flowing through the MOSFET 17 at the start and end of the switching cycle coincide. However, when the duty cycle (on-state time ratio=on-state time duration/switching cycle) of the MOSFET 17 becomes too long, the sizes of the current are no longer able to coincide, and the condition of the current flowing through the MOSFET 17 fluctuates with each switching cycle. This kind of oscillation at low frequency is known as sub-harmonic oscillation, but there are conditions for this sub-harmonic oscillation to occur. Sub-harmonic oscillation can be prevented by slope compensation whereby a monotonically increasing signal is superimposed on the IS terminal voltage, thus preventing the conditions from being established (refer to PTL 1).

FIG. 7 is a circuit diagram showing one example of a heretofore known slope compensation circuit, while FIG. 8 is a timing diagram showing a slope compensation signal generated by the slope compensation circuit of FIG. 7.

Hereafter, a description will be given, based on the timing chart shown in FIG. 8, of a slope compensation operation in the slope compensation circuit 35.

In FIG. 7, the IS terminal voltage signal is input into an input terminal 35a, while the oscillating signal Dmax of the oscillator 34 is input into an input terminal 35b. The gate terminal of each of a serially-connected p-channel transistor M1 and n-channel transistor M2 is connected via an inverter 351 to the input terminal 35b. Of the serially-connected transistors M1 and M2, the source terminal of the M1 is connected to a current source circuit I1, the source terminal of the M2 is grounded, and the commonly connected drain terminals are connected to the base of a PNP transistor T1. Also, a connection point of the transistors M1 and M2 is connected to one end of a capacitor C1, while the other end of the capacitor C1 is grounded.

The emitter of the PNP transistor T1 is connected to the base of an NPN transistor T2 and a current source circuit I2, while the collector of the PNP transistor T1 is grounded. The collector of the NPN transistor T2 is connected to the power supply Vcc, while the emitter of the NPN transistor T2 is connected via serially-connected resistors R1 and R2 and the input terminal 35a to the IS terminal. Also, a connection point of the resistors R1 and R2 is connected to an output terminal 35c.

The slope compensation circuit 35 with the heretofore described configuration is such that the oscillating signal Dmax from the oscillator 34 is supplied to the input terminal 35b, and when the oscillating signal Dmax is at an H level, the transistor M1 is turned on, the transistor M2 is turned off, and the capacitor C1 is charged by the current from the current source circuit I1. This monotonically increasing integrated voltage is applied to the base of the PNP transistor T1 as the kind of continuously rising voltage signal Sa shown in FIG. 8. The voltage signal Sa is level shifted by two emitter followers formed one by each of the PNP transistor T1 and NPN transistor T2 (the level shift amount=(the base-emitter voltage of the PNP transistor T1)−(the base-emitter voltage of the NPN transistor T2)≈0), and a voltage of the same level as the voltage signal Sa is generated at the emitter of the NPN transistor T2. Also, as shown by a dotted line in FIG. 8, the IS terminal voltage signal also rises continuously from a timing t1 at which the MOSFET 17 is turned on. The inclination of the voltage signal is determined by the inductance value of the primary winding 16 of the transformer T shown in FIG. 5 and the input voltage from the AC input 1 (the voltage value of the capacitor 5). It can be assumed that the voltage value of the capacitor 5 is constant within one switching cycle.

Herein, the rise of the oscillating signal Dmax and the turning on of the MOSFET 17 occur at the same timing, because of which, taking the resistance values of the resistors R1 and R2 to be R1 and R2 respectively, the waveform of the voltage signal Sa is added at a voltage division ratio (R1/(R1+R2)) to the IS terminal voltage signal, and output from the output terminal 35c. The voltage waveform of the output terminal 35c is compared in the IS comparator 44 with the feedback voltage waveform from the FB terminal shown in FIG. 6 level shifted by the level shift circuit 43, and when the voltage of the output terminal 35c rises above the level-shifted feedback voltage, the output of the IS comparator 44 changes to an H level. This signal resets the RS flip-flop 38 via the OR gate 46, and as an output Q of the RS flip-flop changes to an L level, the MOSFET 17 is turned off by the drive circuit 42.

At a timing t2 at which the oscillating signal Dmax changes to an L level, the transistor M2 is turned on, and the charge of the capacitor C1 is swiftly released. Because of this, the output voltage of the slope compensation circuit 35 (the voltage of the output terminal 35c) becomes zero, voltage is added again from zero potential when the MOSFET 17 is next turned on, and the switching power supply device is subject to the PWM controlling.

FIG. 9 is a circuit diagram showing one example of a heretofore known oscillator including a frequency modulating function.

The heretofore known oscillator 34 shown in FIG. 9 is configured of current source circuits I3 and I4, which cause a constant current to flow, a p-channel transistor M3 connected via the current source circuit I3 to the power supply Vcc, an n-channel transistor M4 connected in series to the transistor M3 and grounded via the current source circuit I4, a timing capacitor C2, one end of which is connected to a connection point of the transistors M3 and M4 and the other end of which is grounded, comparators 341 and 342 that set a charge voltage upper limit value and discharge voltage lower limit value respectively of a voltage signal Sb of the timing capacitor C2, a frequency modulating modulation period setting circuit 343, to be described hereafter, an AND gate 344 into which an output signal Sc of the modulation period setting circuit 343 and the output signal of the comparator 341 are input, an RS flip-flop 345 that turns the transistors M3 and M4 on and off in a complementary way, and an inverter 346. When it is determined from the feedback signal to the FB terminal that there is a light load condition, the oscillator 34 functions so as to reduce the switching frequency by reducing the current values of the current source circuits I3 and I4, but with regard to the description of the oscillator, it may be supposed that the current is constant.

A first reference voltage V5 is input into the inversion input terminal (−) of the comparator 341, while a second reference voltage V6 is input into the non-inversion input terminal (+) of the comparator 342. The first reference voltage V5 and second reference voltage V6 specify the charge voltage upper limit value and discharge voltage lower limit value respectively of the voltage signal Sb of the timing capacitor C2, and have a relationship such that V5>V6. The output terminal of the comparator 342 is connected to a set terminal S of the RS flip-flop 345, while the output terminal of the comparator 341 is connected via the AND gate 344 to a reset terminal R of the RS flip-flop 345. The Q output (the signal output from the output terminal Q is taken to be the Q output) of the RS flip-flop 345 is supplied from the RS flip-flop 345 to an output terminal 34a of the oscillator 34, output as the oscillating signal Dmax, and connected via the inverter 346 to the gate of each of the transistors M3 and M4.

Now, it will be assumed that the output terminal of the comparator 341 is connected directly to the reset terminal R of the RS flip-flop 345, and that the oscillator 34 has no frequency modulating modulation period setting function. In this case, on the voltage signal Sb of the timing capacitor C2 reaching the first reference voltage V5 input into the inversion input terminal of the comparator 341 at the timing at which the timing capacitor C2 is charged by the current from the current source circuit I3, the flip-flop 345 is immediately reset, and the on and off-states of the transistors M3 and M4 are inverted. Because of this, the timing capacitor C2 is discharged by the current of the current source circuit I4, and on the voltage signal Sb reaching the second reference voltage V6 input into the non-inversion input terminal of the comparator 342, the flip-flop 345 is immediately set, and the on and off-states of the transistors M3 and M4 are inverted again. In this way, an operation whereby the timing capacitor C2 is charged by the current source circuit I3 then discharged by the current source circuit I4 is repeated. Consequently, the length of timings t1 to t4 shown in FIG. 10, to be described hereafter, is specified by the total duration of the charging period and discharging period of the timing capacitor C2 (the length of t2 to t3 is zero). Because of this, the switching frequency of the MOSFET 17 shown in FIG. 5 is determined by the timing capacitor C2 alone, while the maximum duty cycle is specified by only the charging period and discharging period of the timing capacitor C2.

As opposed to this, the oscillator 34 of FIG. 9 equipped with the frequency modulating function is such that it is possible, using the modulation period setting circuit 343, to provide a modulation period (idle period), whose temporal length fluctuates with each cycle, between the charging period and discharging period. Consequently, the cycle of the oscillator 34 oscillating signal, that is, the switching cycle of the switching power supply, is the sum of the charging period, the modulation period (idle period), and the discharging period.

The modulation period setting circuit 343 is configured of an inverter 347 that inverts the output signal of the comparator 341, a current source circuit I5 connected to the power supply Vcc, a p-channel transistor M5 and n-channel transistor M6, whose gate terminals are connected to the output terminal of the inverter 347 and which are turned on and off alternately, a counter 348 that sets an idle period, p-channel transistors M71, M72 to M7n selected by an n-bit on/off signal of the counter 348, and capacitors C31, C32 to C3n connected in series to the transistors M71, M72 to M7n respectively.

FIG. 10 is a timing diagram showing a signal waveform of each portion of the oscillator.

Herein, a description will be given of the waveform of the oscillating signal Dmax shown in FIG. 10 output from the oscillator 34.

The oscillator 34 shown in FIG. 9 is such that, although the operation of charging the timing capacitor C2 finishes at the timing t2, a modulation period (idle period t2 to t3) is provided from the timing t2 to t3, rather than starting discharging immediately after the charging operation. That is, the modulation period setting circuit 343 is such that when the operation of charging the timing capacitor C2 finishes, the current of the current source circuit I5 starts charging the capacitors C31, C32 to C3n via the selected transistors M71, M72 to M7n. The operation of discharging the timing capacitor C2 starts at a timing t3 at which the charging of the capacitors C31, C32 to C3n is completed (that is, the timing at which the voltage Sc, which is the charge voltage of the capacitors C31, C32 to C3n, reaches a threshold value voltage with respect to the input of the AND gate 344). The modulation period setting circuit 343 is such that the capacitance values of the capacitors C31, C32 to C3n can be switched by turning on or off the switches of the p-channel transistors M71, M72 to M7n, because of which the length of the charging period of the capacitors C31, C32 to C3n, that is, the modulation period (idle period t2 to t3), varies. In this way, the oscillator 34 is such that it is possible, using the modulation period setting circuit 343, to set a modulation period (idle period t2 to t3) between the frequency fixing periods (t1 to t2, t3 to t4) of the oscillating signal Dmax of the oscillator 34.

In this way, the modulating method of the oscillator 34 equipped with a frequency modulating function is such that it is possible to modulate the frequency of the oscillating signal Dmax by modulating the idle period t2 to t3 of the timing capacitor C2. This is because the switching cycle of the MOSFET 17 is specified by the total of the charging period (t1 to t2) of the timing capacitor C2, the charging period (t2 to t3) of the capacitors C31, C32 to C3n, and the discharging period (t3 to t4) of the timing capacitor C2. In this way, it is possible to modulate the switching frequency of the switch signal Sout by modulating the idle period of the timing capacitor C2. Further, the charging period of the capacitors C31, C32 to C3n is inversely proportional to the total capacitance value of the capacitors connected to the current source circuit I5, and which capacitors are to be connected is determined by the p-channel transistors M71, M72 to M7n, which are turned on or off in accordance with the count value of the counter 348, which value is lowered or raised with each cycle of the oscillating signal Dmax (each switching cycle) (refer to PTL 2).

Regarding the way of modulating the switching cycle, various methods have been proposed to date, apart from that heretofore described.

The control IC 8 described above is such that level limitation is carried out by the OCP comparator 45 so that the drain current Ids flowing through the MOSFET 17 does not rise to or above the constant current. This is as has already been described based on FIG. 6, which shows the internal circuit configuration of the IC 8.

FIGS. 11A and 11B are diagrams showing changes in the overcurrent protection level when the input voltage changes.

The MOSFET 17 is turned off after the size of the drain current Ids flowing when the MOSFET 17 is in an on-state reaches an overcurrent detection level, but a certain delay time r is needed until the drain current Ids is actually cut off, as shown in FIG. 11A. The length of the delay time τ is specified by a current detecting terminal noise filter, circuit delay factors inside the control IC 8, a delay time in the switching operation of the MOSFET 17 itself, or the like. Further, when the input voltage from the AC input 1 is high, the inclination of the current flowing through the primary winding 16 of the transformer T when the MOSFET 17 is turned on increases, as shown in FIG. 11B. Although the angle of inclination also depends on the inductance value of the primary winding 16, the inclination when the input voltage is low is gentle, as shown in FIG. 11A, while the inclination is steep when the input voltage is high.

However, as shown in FIG. 6, the overcurrent detection voltage in the OCP comparator 45 is set to a constant value in accordance with the reference power supply V3. Because of this, the inductance current (=Ids) flowing during the delay time r continues to rise, and the current limit value when the MOSFET 17 is actually turned off is such that the higher the input voltage from the AC input 1, the higher the value of the peak current when an overcurrent protection operation is carried out. Generally, as the current limit value set for the load 25 is determined in accordance with the overcurrent detection level when the input voltage is low, a current higher than the overcurrent detection level desired by the designer flows when the input voltage is high. Consequently, the heretofore known flyback power supply whose PWM is to be controlled is such that it is necessary to increase the rated current of the MOSFET 17, transformer T, and the like, which is a factor leading to an increase in the cost and size of the power supply device.

CITATION LIST

Patent Literatures

PTL 1: JP-A-2004-40856
PTL 2: JP-A-2010-245675

PTL 3: U.S. Patent Publication No. 2008/0291700 Specification (refer to Paragraph Nos. [0025] to [0026], FIGS. 4 and 5)

PTL 4: JP-A-2002-153047 (refer to Paragraph Nos. [0048] to [0054], FIG. 4)

SUMMARY

In response to this phenomenon, the following kind of countermeasure is taken in the disclosure of a power supply device of PTL 3. According to PTL 3, by level shifting an oscillator triangular wave to the level of an overcurrent protection reference voltage, inclination is provided to the detection level so that the overcurrent protection reference voltage is increased at a time of a low input voltage when the on-state duration of a MOSFET Q1 increases, while the overcurrent protection reference voltage is reduced at a time of a high input voltage when the on-state duration of the MOSFET Q1 decreases. FIG. 12 is a diagram showing a condition wherein the overcurrent detection level is changed in accordance with the size of the input voltage. As shown here, by continuously changing the overcurrent detection level in accordance with the size of the input voltage, it is possible to obtain a constant overcurrent protection peak current value (shown as a current limit in the drawing) for the MOSFET Q1, regardless of the size of the input voltage.

That is, the technology of PTL 3 is based on thinking similar to that of embodiments of the present invention, to be described hereafter, but an embodiment shown therein indicates only that overcurrent limitation is carried out by an overcurrent protection circuit (a power limiter 60) receiving a voltage signal (a saw tooth signal: Saw Signal) $V_{SAW}$ from an oscillator (an oscillator 10).

However, according to the countermeasure of PTL 3, it cannot be applied to an oscillator having the heretofore described idle period. This is because, when applying the method of PTL 3 to the oscillator 34 equipped with a frequency modulating function, illustrated in FIG. 9, the overcurrent protection reference voltage (the reference power supply V3 of the OCP comparator 45) becomes constant in the idle period (modulation period).

FIG. 13 is a timing diagram illustrating an overcurrent protection operation when the method of PTL 3 is applied to the oscillator of FIG. 9 including a frequency modulating function. As shown in FIG. 13, on frequency fixing periods elapsing at timings t2 and t5, and frequency modulation periods (t3 to t4, t5 to t6) starting, it is no longer possible to correct the level of the overcurrent protection reference voltage with the voltage signal Sb, which corresponds to the voltage signal $V_{SAW}$ of PTL 3. Consequently, it becomes impossible at this time to correct MOSFET 17 overcurrent protection peak current fluctuation caused by the input voltage from the AC input 1.

As another disclosure, a chopper regulator shown as a second embodiment in PTL 4 is such that an input current (overcurrent) is detected using a resistor 49, and an output is inverted in a comparator 63 on the difference between two input voltages reaching Vc.

Herein, a voltage divider circuit 66 is for detecting an input voltage, and the voltage dividing ratio is reduced by the output of the voltage divider circuit 66 so that a base current Ib flowing through a transistor 67 is not saturated. A current equivalent to the times the base current Ib of the transistor 67 flows through a regulating resistor 65, because of which, when the input voltage increases, the voltage drop of the regulating resistor 65 increases commensurately. Also, as a voltage which is the sum of the voltage drop in the current detecting resistor 49 and the voltage drop in the regulating resistor 65 is input into the comparator 63, the higher the input voltage, the higher too the difference between the two input voltages of the comparator 63, even when the current flowing through the current detecting resistor 49 is the same size. That is, the higher the input voltage, the earlier it is possible to determine that an overcurrent is flowing (refer to FIG. 4 of PTL 4).

However, this method is such that the input voltage is applied as it is to the non-inversion input terminal (+) of the comparator 63, because of which, when the input voltage is obtained from an input power supply wherein an alternating current power supply has been rectified, a problem occurs in that the voltage value thereof is too high, and the input voltage cannot be input as it is into the comparator. Also, when making a power supply control circuit with an integrated circuit, input terminals for the comparator 63 are necessary, and two additional external terminals are necessary for the integrated circuit. When creating an integrated circuit, the number of terminals needed is always a large problem. Furthermore, as it is normally preferable that the resistance value of the resistor 49 is a small value, there is a problem in that the voltage input into the inversion input terminal (−) of the comparator 63 is also a high voltage (refer to FIG. 4 of PTL 4).

In order to solve this problem, it is conceivable that a current detecting resistor is provided between the switching MOSFET 17 and the ground potential (GND), as with the sense resistor 12 used in FIG. 5. However, in order to apply the chopper regulator of PTL 4, a negative power supply is needed in the control circuit. Normally, preparing a negative power supply is not desirable, as the circuit scale increases.

An aspect of the invention, having been contrived bearing in mind these kinds of point, has an object of providing a switching power supply device control circuit and switching power supply such that it is possible to correct fluctuations in the peak current of an overcurrent flowing through a switching element, even when using an oscillator having a modulation period (idle period) in the oscillation waveform.

Solution to Problem

In order to solve the heretofore described problems, an aspect of the invention provides a control circuit of a flyback type switching power supply device that converts the voltage of an AC input into a predetermined direct current voltage by turning a switching element on and off and supplies the voltage to a load. The switching power supply device control circuit is configured of a current detecting circuit, connected to the switching element, that converts the current of the switching element into a voltage signal, an overcurrent protection circuit that detects an overcurrent with respect to the load based on a current signal converted by the current detecting circuit, a voltage correction circuit that corrects a reference voltage signal to the overcurrent protection circuit in response to a change in voltage of the AC input, an oscillator circuit having a frequency modulating function whereby the switching frequency with respect to the switching element can be modulated, and a slope compensation circuit that generates a slope compensation signal increasing monotonically in proportion to an on-state period of the switching frequency including a frequency modulation period set by the oscillator circuit.

The switching power supply device is such that the voltage correction circuit corrects the reference voltage signal in accordance with the slope compensation signal.

Also, according to another aspect of the invention, there is provided a flyback type switching power supply that converts the voltage of an AC input into a predetermined direct current voltage by turning a switching element on and off and supplies the voltage to a load. The switching power supply is configured of a current detecting circuit, connected to the switching element, that converts the current of the switching element into a voltage signal, an overcurrent protection circuit that detects an overcurrent with respect to the load based on a current signal converted by the current detecting circuit, a voltage correction circuit that corrects a reference voltage signal to the overcurrent protection circuit in response to a change in voltage of the AC input, an oscillator circuit having a frequency modulating function whereby the switching frequency with respect to the switching element can be modulated, and a slope compensation circuit that generates a slope compensation signal increasing monotonically in proportion to an on-state period of the switching frequency including a frequency modulation period set by the oscillator circuit.

The switching power supply is such that the voltage correction circuit corrects the reference voltage signal in accordance with the slope compensation signal.

Advantageous Effects

According to embodiments of the invention, it is possible to realize a function of regulating the overcurrent protection level without increasing the circuit scale, even when using an oscillator having a modulation period (idle period) in the oscillation waveform.

Consequently, it is possible, in an IC that controls a power supply circuit (flyback) and has a function of modulating frequency using a modulation period (idle period) for reducing EMI noise, to turn off a MOSFET at the same overcurrent level, regardless of the input voltage.

Further, by turning off a switch at the same overcurrent level, it is possible to eliminate an unnecessary margin in the rated current of the switch, inductor, and transformer, and thus possible to realize a reduction in the cost and size of the power supply device.

The heretofore described and other objects, characteristics, and advantages of the invention will be made clear by the attached drawings representing an embodiment preferred as an example of the invention, and by the following related description.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

Figure 1:
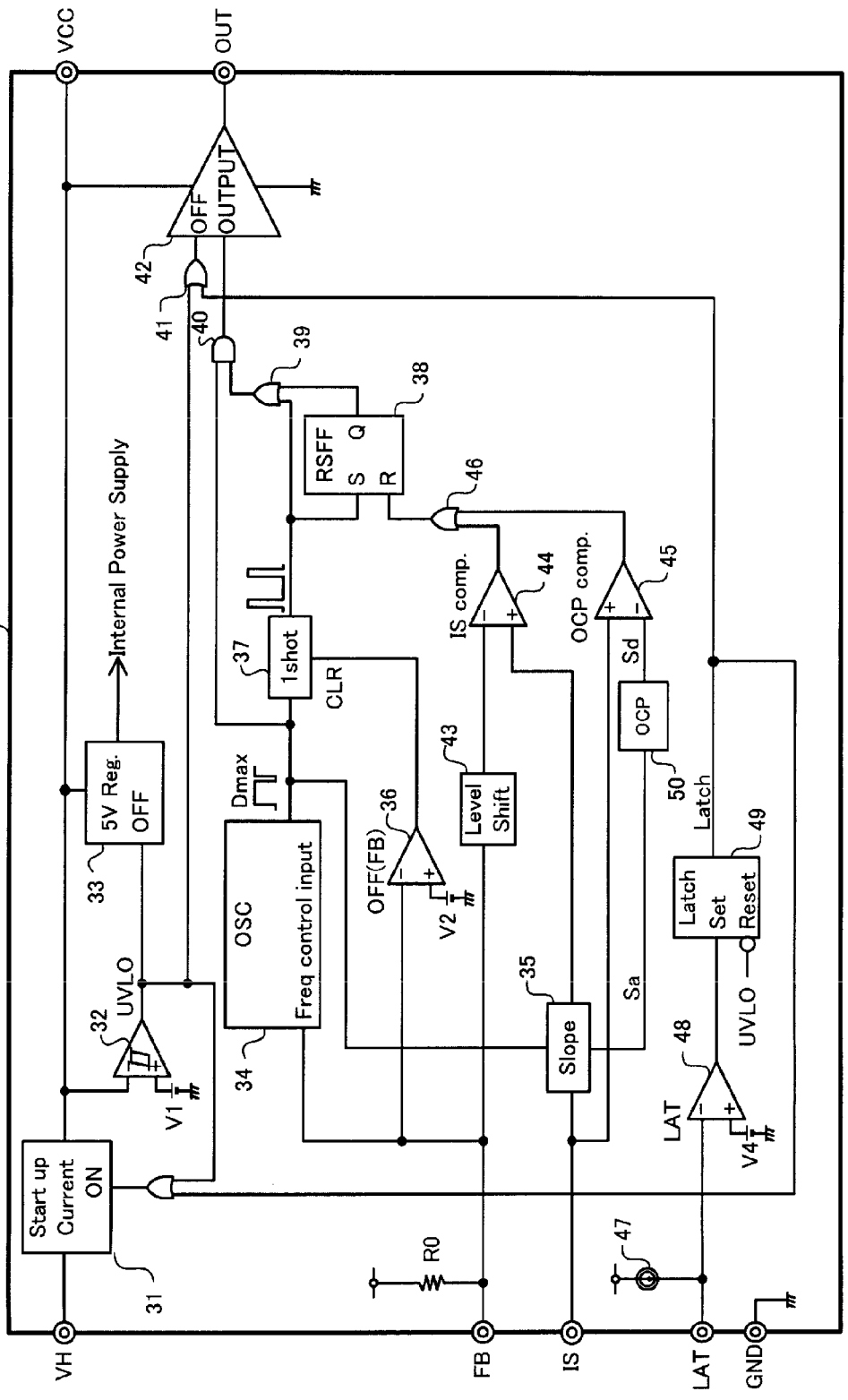
FIG. 1 is a block diagram showing a configuration of a switching power supply control circuit according to an embodiment.

Hereafter, referring to the drawings, a description will be given of an embodiment of the invention. FIG. 1 is a block diagram showing a configuration of a switching power supply control circuit according to the embodiment.

Figure 5:
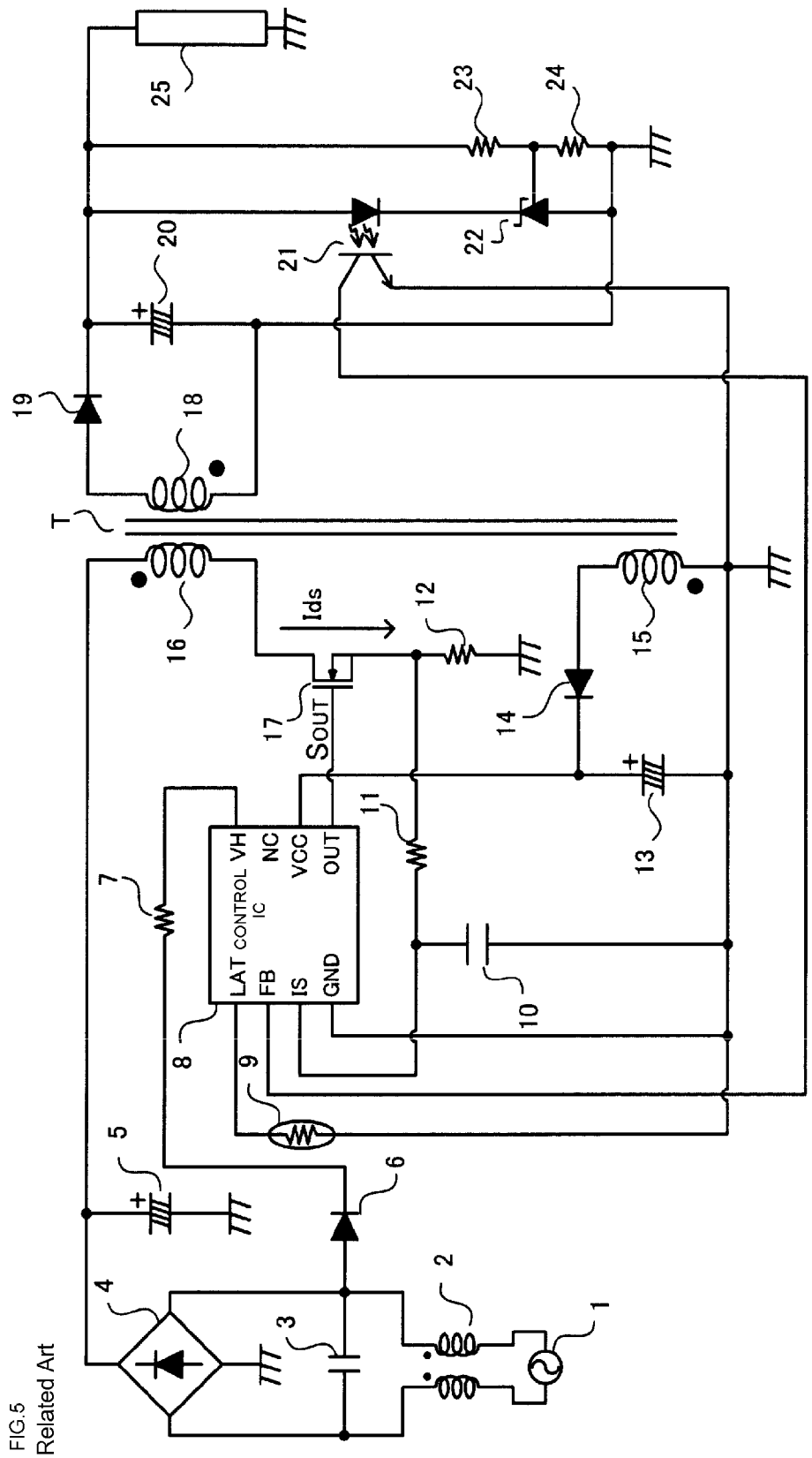
FIG. 5 is a diagram showing a circuit configuration of a flyback power supply using a PWM controlling integrated circuit (IC).
Figure 6:
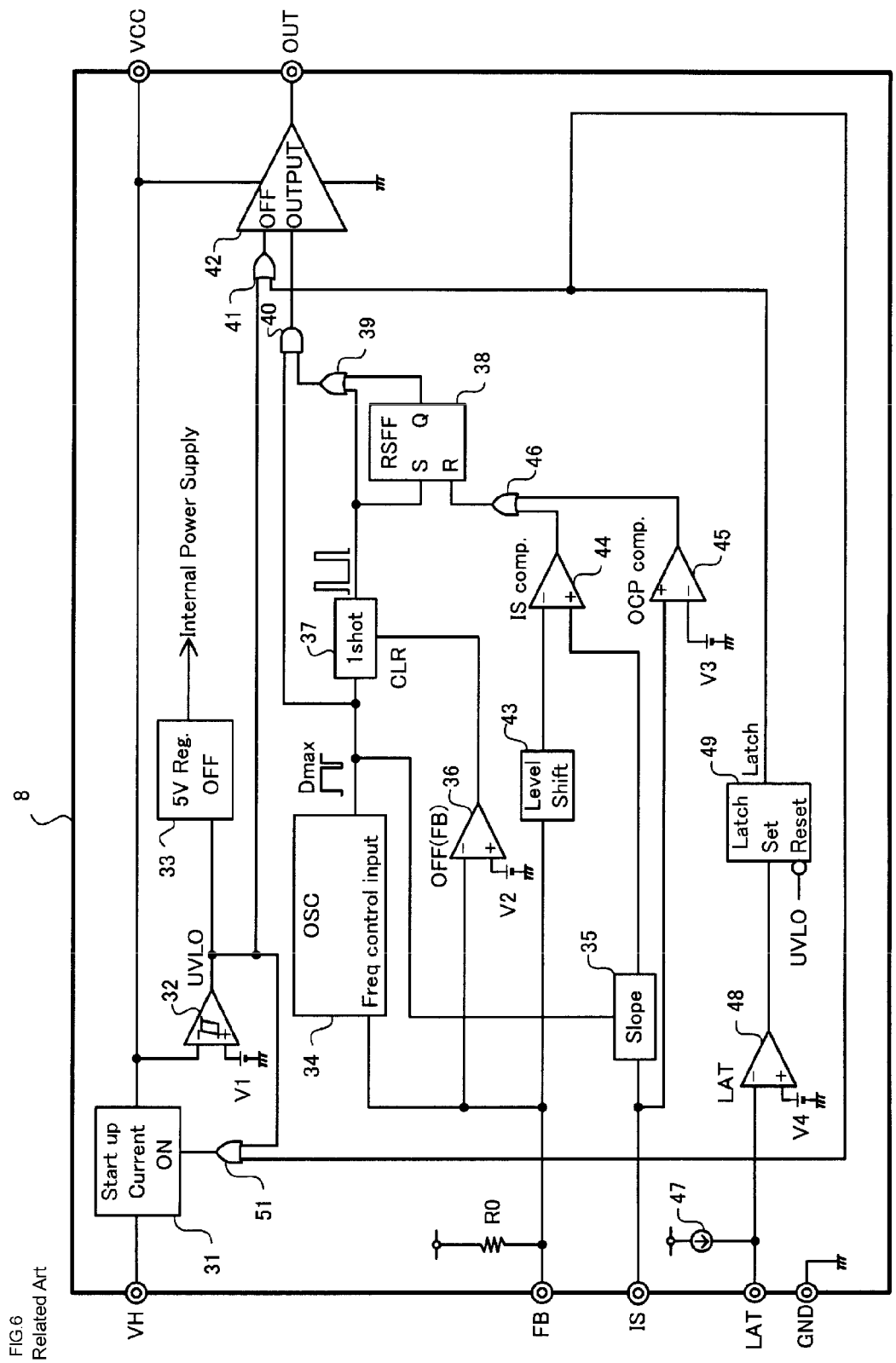
FIG. 6 is a block diagram showing an internal circuit configuration of a related PWM controlling control IC.

A control IC 8 configuring the switching power supply control circuit has basically the same configuration as a related PWM controlling control IC 8 previously described in FIG. 6. The control IC 8, based on voltage from an AC input 1, controls a flyback power supply (refer to FIG. 5) that generates a constant output voltage. Also, a current detecting sense resistor 12 for converting the voltage of current flowing through a MOSFET 17, shown in FIG. 5, an IS terminal that detects a converted voltage signal, and an OCP comparator 45 for detecting an overcurrent in the control IC 8 configure an overcurrent protection circuit for detecting overcurrent.

A description will be given of portions in FIG. 1 differing from a heretofore known switching power supply control circuit, while the same reference signs are given to portions corresponding to the heretofore known circuit shown in FIG. 6, and a detailed description thereof will be omitted. Differences between the control IC 8 and the heretofore known circuit (FIG. 6) are that an overcurrent level setting circuit 50 is connected to the inversion input terminal (−) of the OCP comparator 45, and the overcurrent protection level of the MOSFET 17 is determined without using a reference power supply V3.

Firstly, a description will be given of an operation of the control IC 8 when protecting from overcurrent.

The MOSFET 17 is turned on, current flows through the sense resistor 12 connected to the MOSFET 17, and the voltage of the IS terminal of the control IC 8 rises. On the voltage of the IS terminal of the control IC 8 rising to or above an overcurrent protection level voltage inside the control IC 8, the output of the overcurrent detecting OCP comparator 45 is inverted, and a reset signal is generated for an RS flip-flop 38 of a subsequent stage. On the RS flip-flop 38 being reset, a signal causing the MOSFET 17 to be turned off is output from an OUT terminal. As the output signal of a one-shot circuit 37 is a short pulse signal, and is normally at an L level at a point at which an overcurrent occurs, the output of an OR gate 39 is fixed by the output of the RS flip-flop 38. Also, input noise immediately after the MOSFET 17 is turned on can be eliminated by adding an unshown leading edge blanking circuit, or the like, to the IS terminal of the control IC 8.

The overcurrent level setting circuit 50 is connected between a slope compensation circuit 35 and the inversion input terminal (−) of the OCP comparator 45, and outputs a reference voltage signal Sd determining the overcurrent protection level. The overcurrent level setting circuit 50 is such that the reference voltage signal Sd rises continuously from immediately after the MOSFET 17 is turned on, correcting the phenomenon whereby the peak current when protecting the MOSFET 17 from overcurrent becomes higher the higher the level of the input voltage from the AC input 1.

Figure 2:
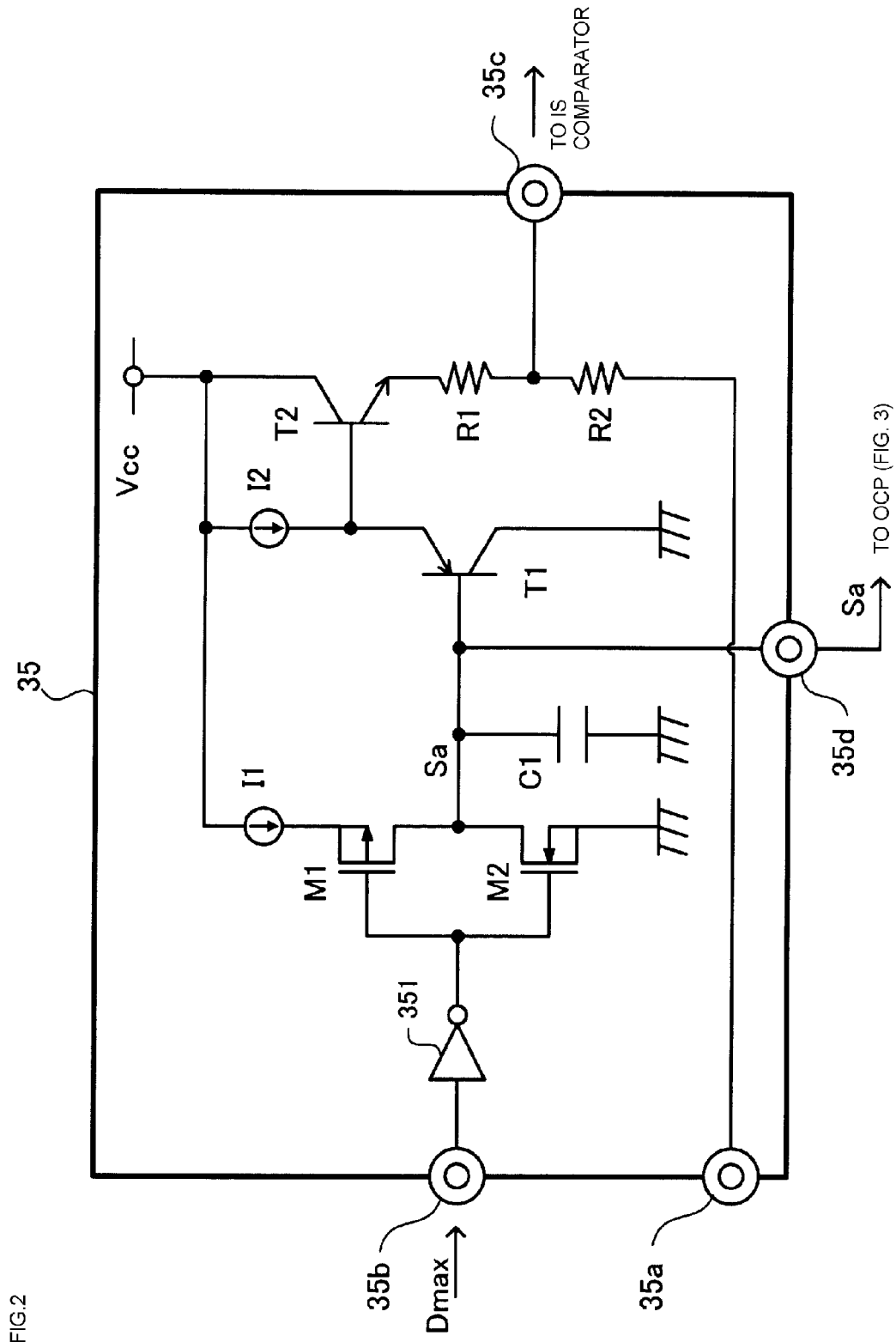
FIG. 2 is a circuit diagram showing a slope compensation circuit in the control circuit of FIG. 1.

FIG. 2 is a circuit diagram showing the slope compensation circuit in the control circuit of FIG. 1.

Figure 7:
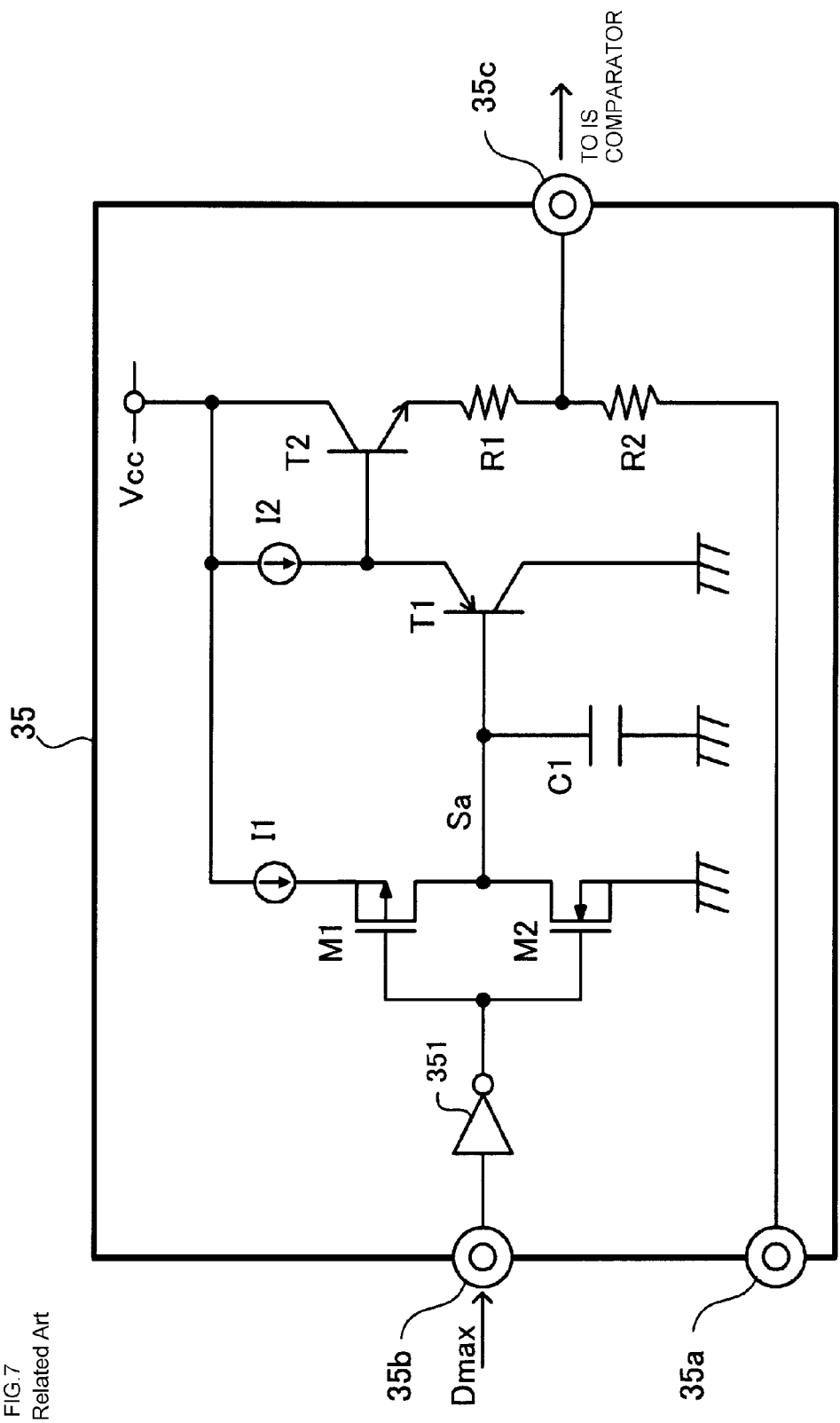
FIG. 7 is a circuit diagram showing one example of a heretofore known slope compensation circuit.
Figure 8:
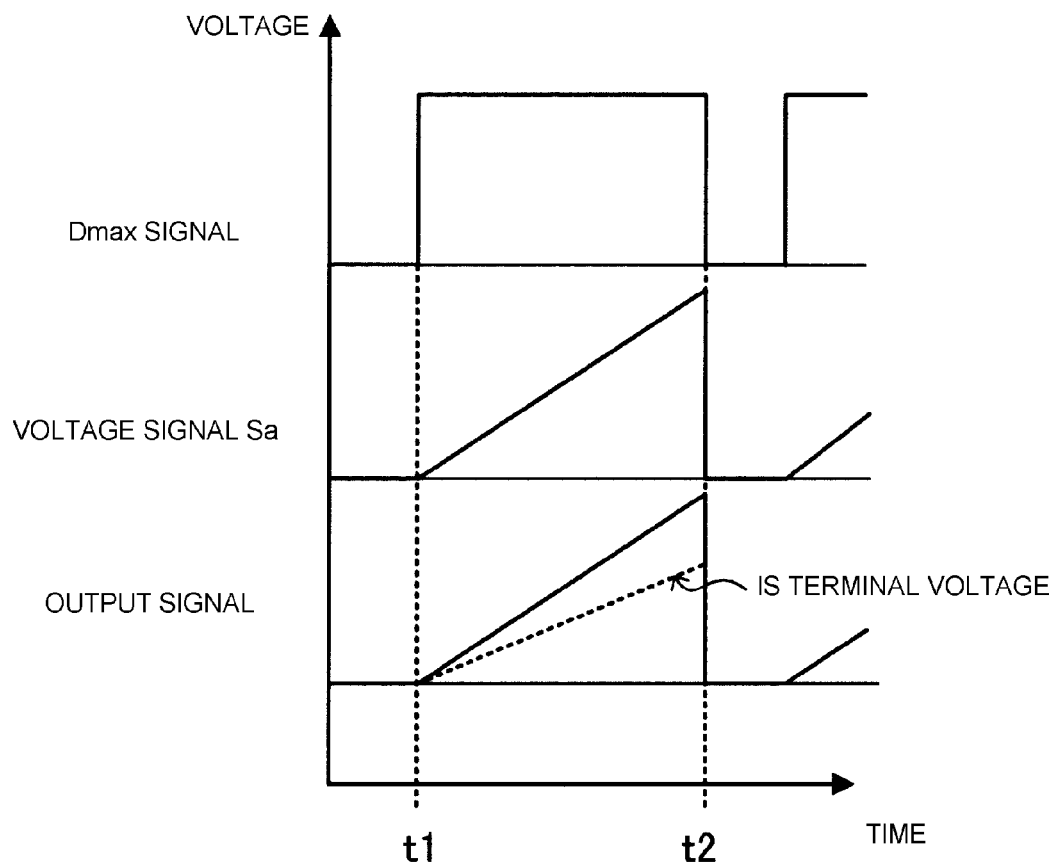
FIG. 8 is a timing diagram showing a slope compensation signal generated by the slope compensation circuit of FIG. 7.

The slope compensation circuit 35 has the same configuration as a heretofore known slope compensation circuit 35 shown in FIG. 7, except for including a terminal 35d for outputting a slope voltage signal Sa. That is, in the slope compensation circuit 35, a capacitor C1 is charged by a current from a current source circuit I1 on an oscillating signal Dmax of an oscillator 34 input from an input terminal 35b changing to an H level, and generates an integrated voltage Sa that increases monotonically, as described in relation to FIG. 7. The monotonically increasing integrated voltage Sa is output from the terminal 35d as a slope voltage signal Sa.

That is, when the MOSFET 17 that carries out a switching operation is turned on, the capacitor C1 is charged, generates the monotonically increasing slope voltage signal Sa, and outputs the slope voltage signal Sa to the overcurrent level setting circuit 50. Consequently, the gradient of the slope voltage signal Sa is determined by the capacitance value of the capacitor C1 and the value of the current (I1) from the current source circuit I1, and the slope voltage is such that the voltage value increases further the longer the on-state duration of the switching in the MOSFET 17.

Figure 3:
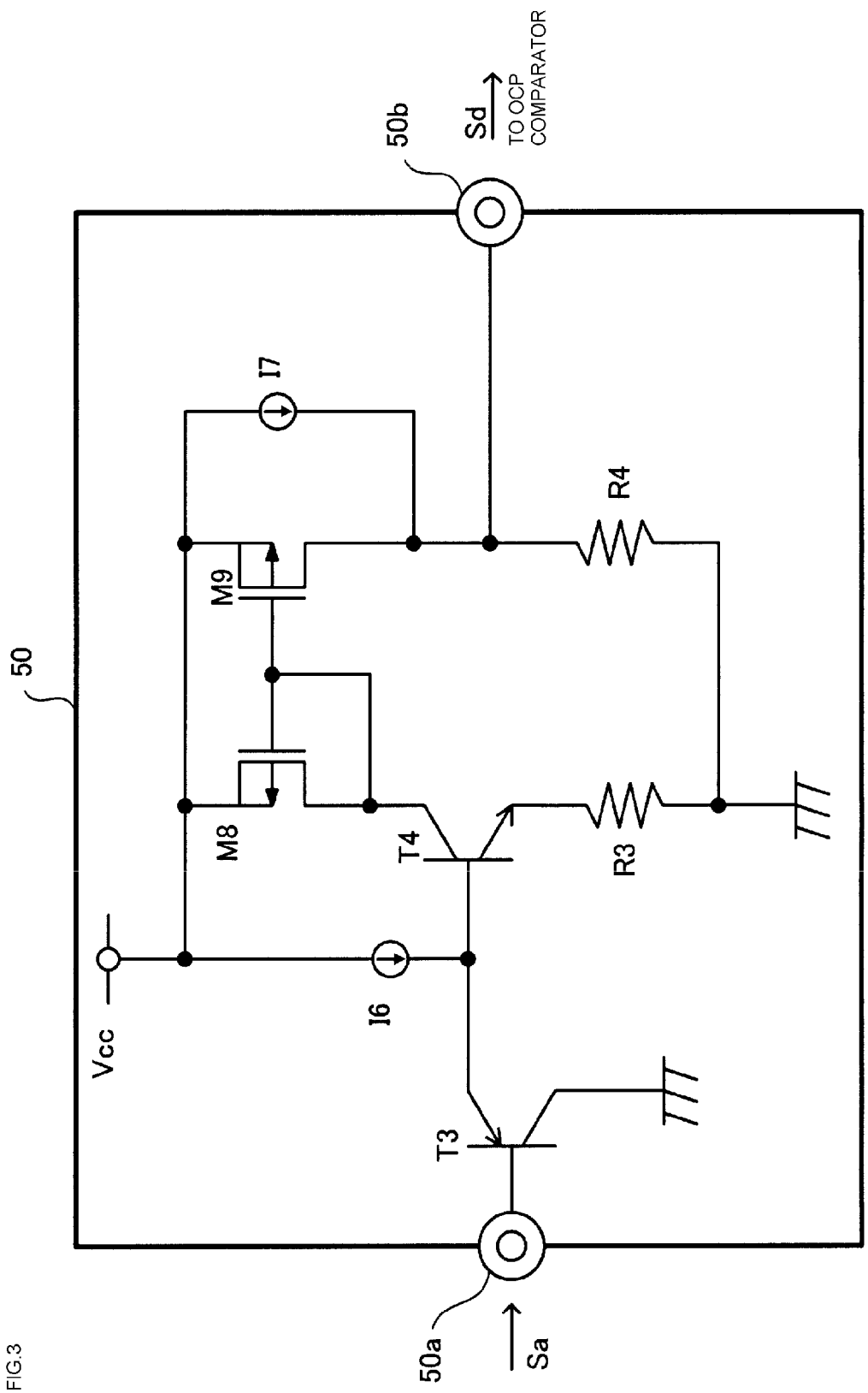
FIG. 3 is a circuit diagram showing an overcurrent level setting circuit in the control circuit of FIG. 1.

FIG. 3 is a circuit diagram showing the overcurrent level setting circuit in the control circuit of FIG. 1.

The overcurrent level setting circuit 50 includes an input terminal 50a, into which the slope voltage signal Sa is input, and an output terminal 50b, which outputs the reference voltage signal Sd. The overcurrent level setting circuit 50 is configured of a PNP transistor T3 and an NPN transistor T4, each of which configures an emitter follower circuit, current source circuits I6 and I7, p-channel transistors M8 and M9 configuring a current mirror circuit, and resistors R3 and R4. In the overcurrent level setting circuit 50, a voltage signal which is (the slope voltage signal Sa+the base-emitter voltage of the PNP transistor T3) is generated at the emitter terminal of the PNP transistor T3 in the emitter follower formed of the PNP transistor T3, while a voltage signal which is (the slope voltage signal Sa+the base-emitter voltage of the PNP transistor T3−the base-emitter voltage of the NPN transistor T4≈the slope voltage signal Sa) is generated at the emitter terminal of the NPN transistor T4 in the emitter follower formed of the NPN transistor T4. This is done in order to apply the slope voltage signal Sa with converted impedance to the resistor R3.

As the slope voltage signal Sa with converted impedance is applied to the resistor R3, a current proportional to the slope voltage signal Sa flows through the resistor R3. This current is copied in the current mirror circuit formed of the transistors M8 and M9, and a current wherein a reference current of the current source circuit I7 (the current value is also expressed as I7) is added to the copied current flows through the resistor R4 (the resistance value thereof is also expressed as R4). That is, the voltage of a current wherein the reference current (I7) is added to the current proportional to the slope voltage signal Sa is converted by the resistor R4, forming the reference voltage signal Sd. Consequently, the reference voltage signal Sd determining the overcurrent protection level output from the output terminal 50b increases continuously from a non-zero initial voltage (=I7×R4) (the increase is generated by the current proportional to the slope voltage signal Sa flowing through the resistor R4).

The reference voltage signal Sd, wherein the voltage proportional to the slope voltage signal Sa and the initial voltage are added together, is supplied to the inversion input terminal (−) of the OCP comparator 45, as shown in FIG. 1. Because of this, a reset signal is input into the RS flip-flop 38 on the voltage of the IS terminal of the control IC 8 rising above the reference voltage signal Sd. Consequently, it is possible to cause the MOSFET 17 to be turned off at the timing at which the output signal of the OCP comparator 45 is inverted.

Figure 4A:
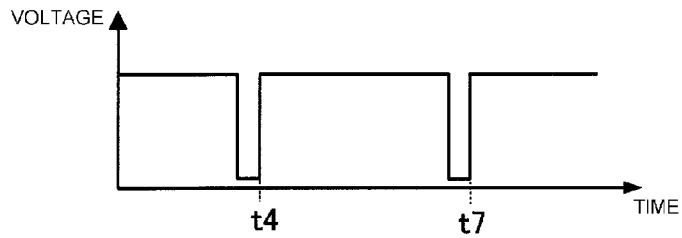
FIGS. 4A-E are timing diagrams illustrating a correction operation by the overcurrent level setting circuit of FIG. 3.
Figure 4B:
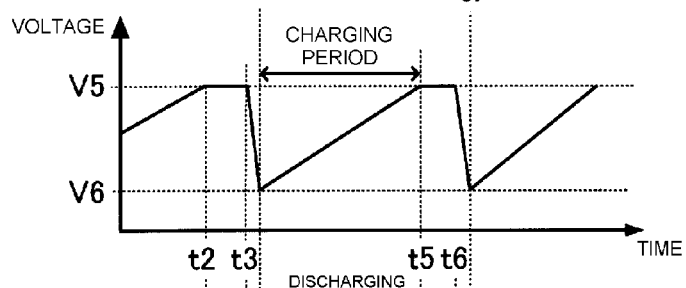
Figure 4C:
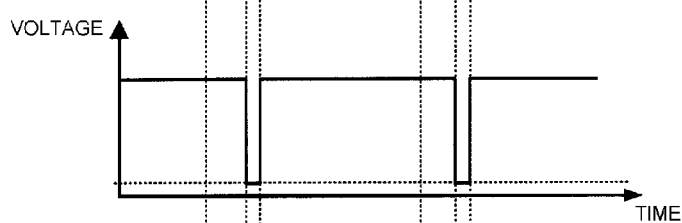

FIGS. 4A and 4B are timing diagrams illustrating a correction operation by the overcurrent level setting circuit of FIG. 3.

Figure 9:
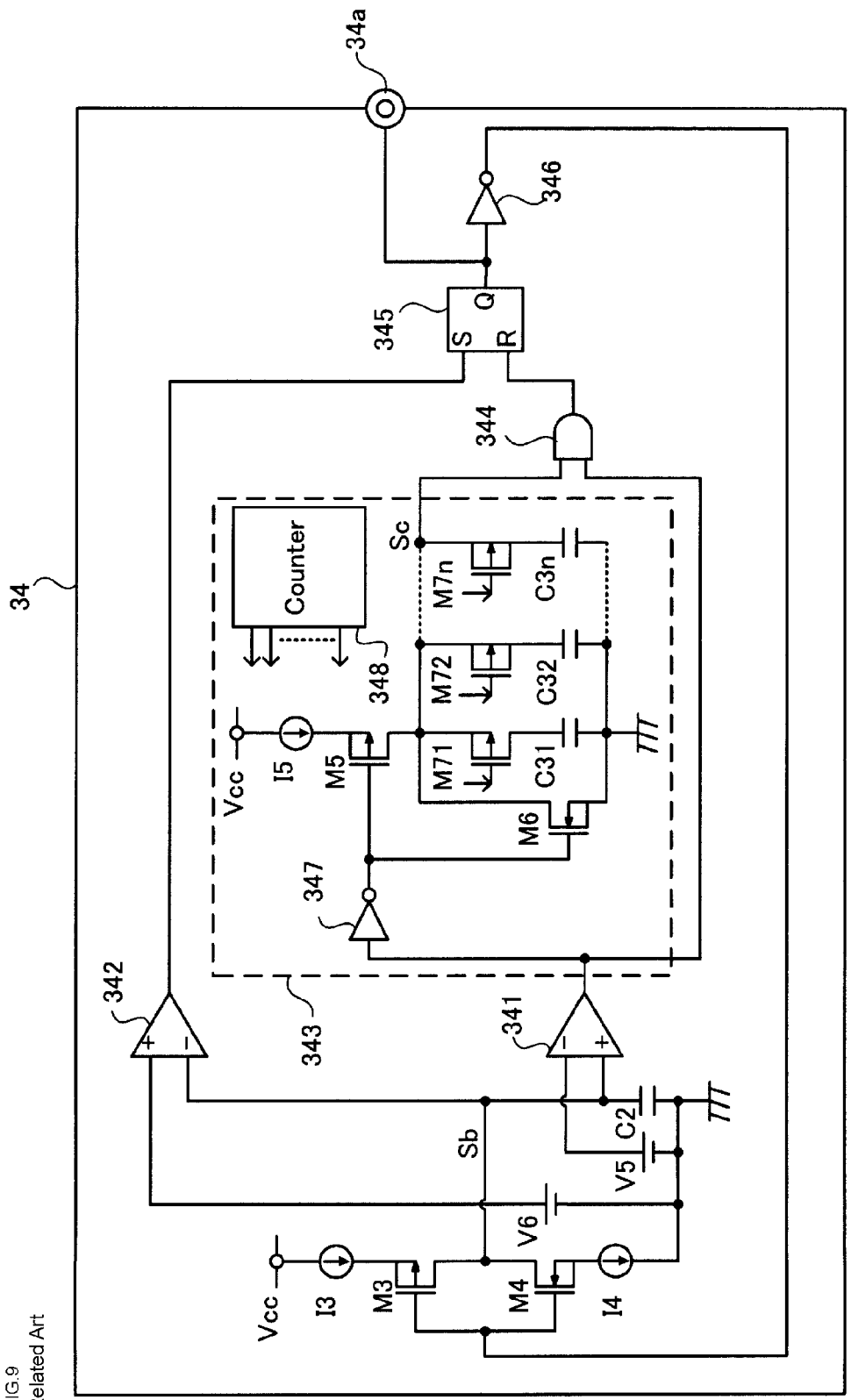
FIG. 9 is a circuit diagram showing one example of a heretofore known oscillator including a frequency modulating function.
Figure 10:
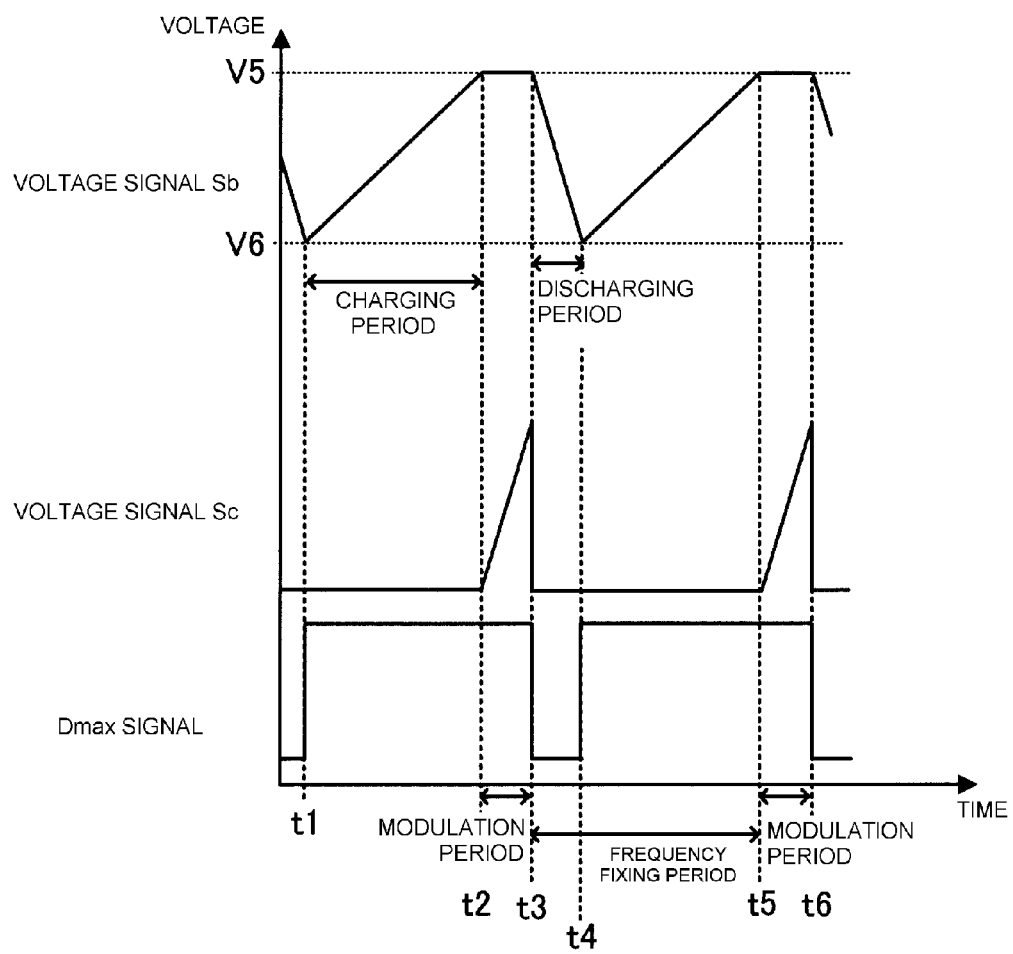
FIG. 10 is a timing diagram showing a signal waveform of each portion of the oscillator.
Figure 11A:
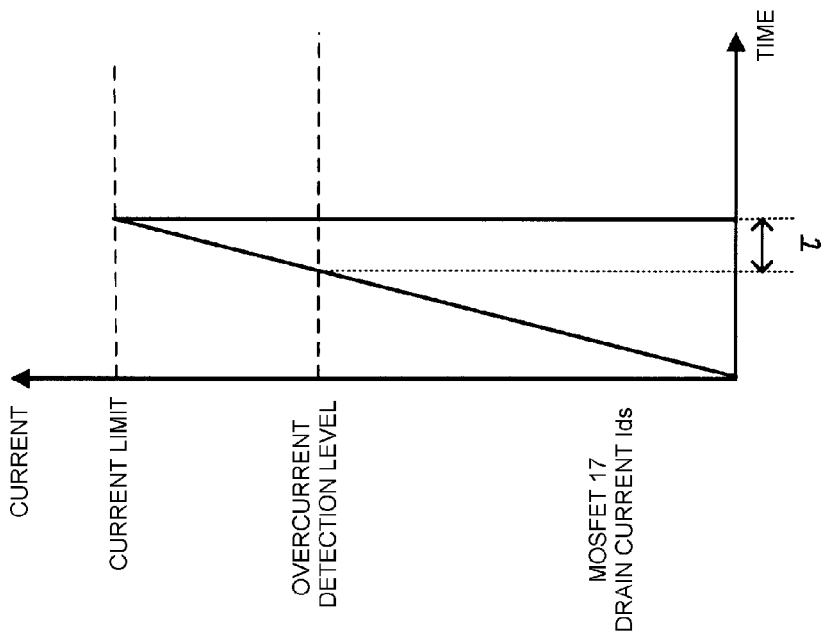
FIGS. 11A and 11B are diagrams showing changes in the overcurrent protection level when the input voltage changes.
Figure 11B:
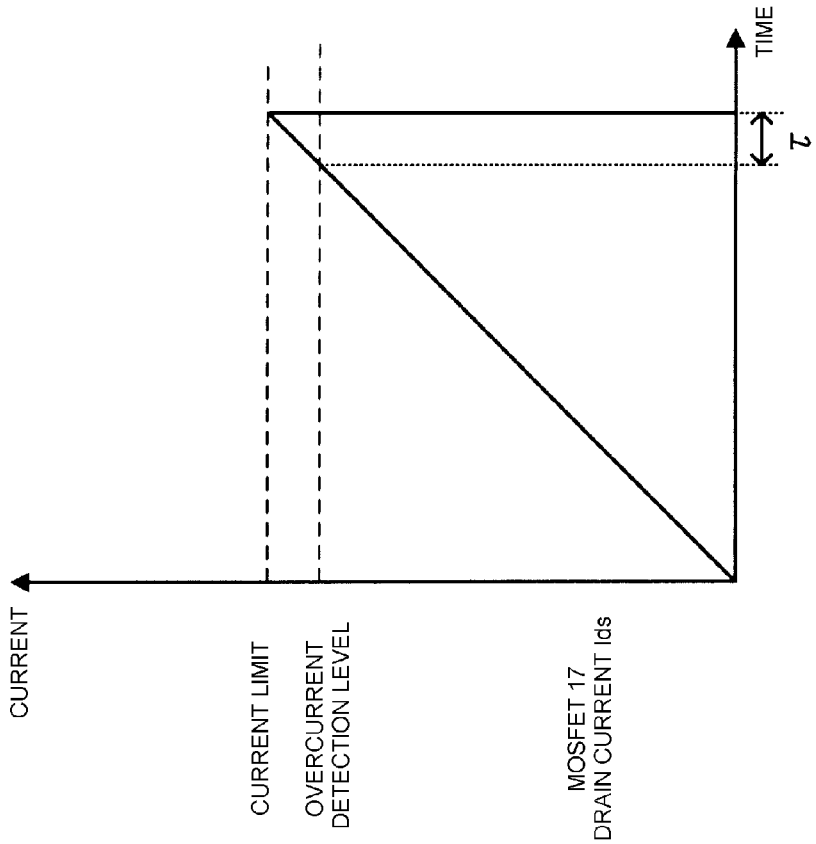
Figure 12:
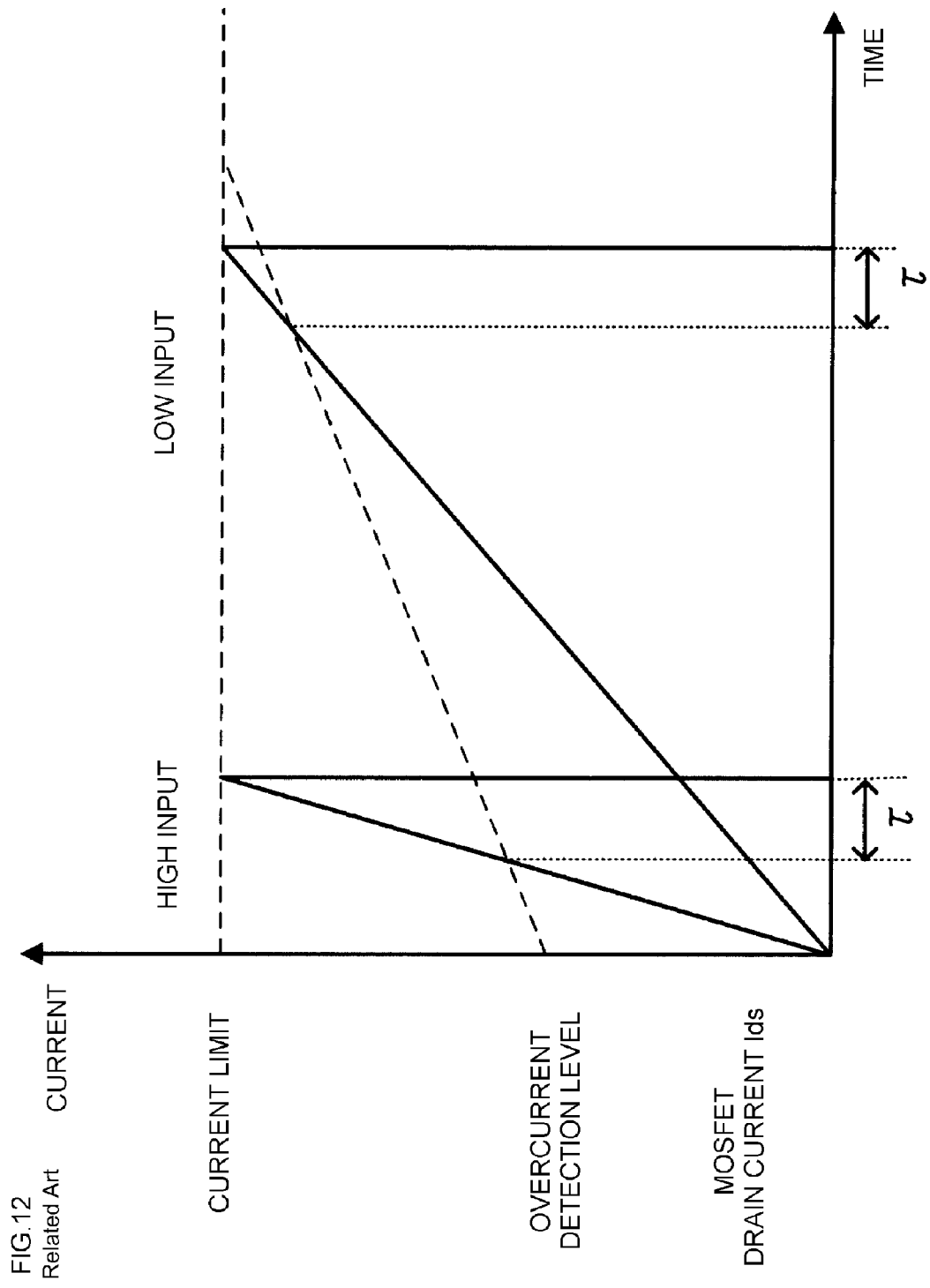
FIG. 12 is a diagram showing a condition wherein the overcurrent detection level is changed in accordance with the size of the input voltage.
Figure 13:
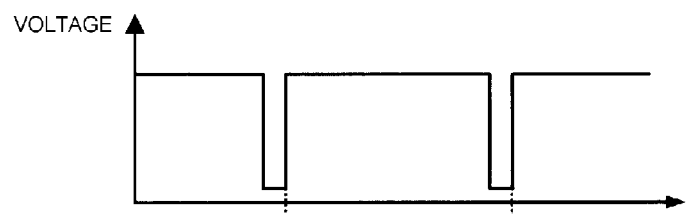
FIG. 13 is a timing diagram illustrating an overcurrent protection operation when the method of PTL 3 is applied to the oscillator of FIG. 9 including a frequency modulating function.
Figure 13:
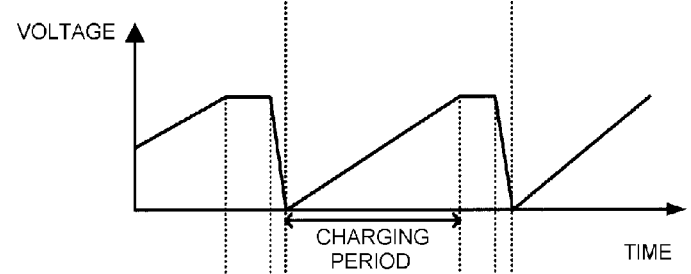
Figure 13:
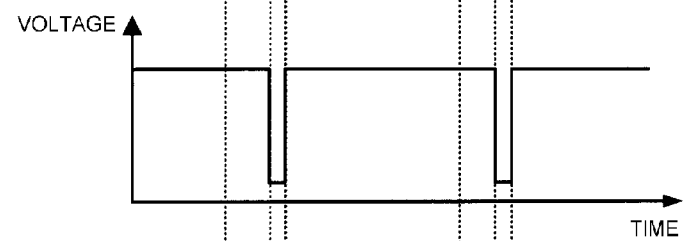
Figure 13:
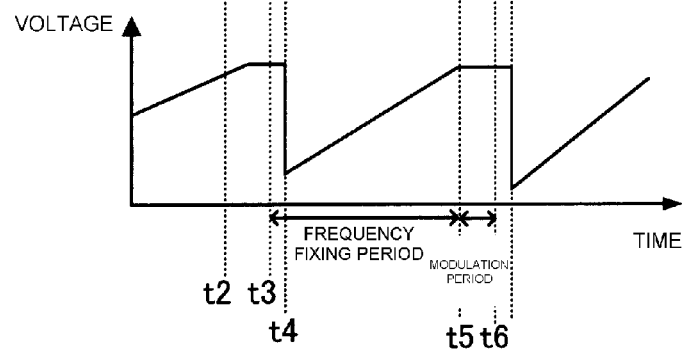

A voltage signal Sb (a trapezoidal wave signal) and the oscillating signal Dmax, each generated by the oscillator 34 (FIG. 9), rise simultaneously at a timing t4, a timing t7, and the like, as shown in FIGS. 4(B) and (C), while an H level switch signal Sout is output from a drive circuit 42 to the OUT terminal, as shown in FIG. 4A. Because of this, it is possible to cause the MOSFET 17 to be turned on.

Figure 4D:
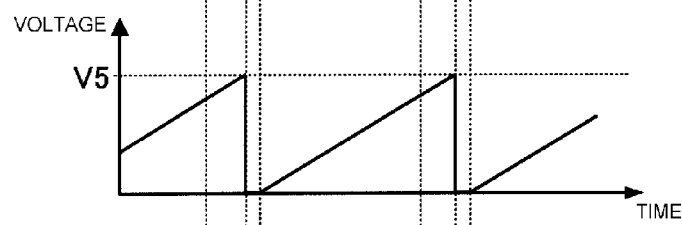

The continuously rising slop voltage signal Sa is generated in the slope compensation circuit 35 by the capacitor C1 being charged from the current source circuit I1 in synchronization with the timings t4 and t7 at which the oscillating signal Dmax rises, as shown in FIG. 4D.

Figure 4E:
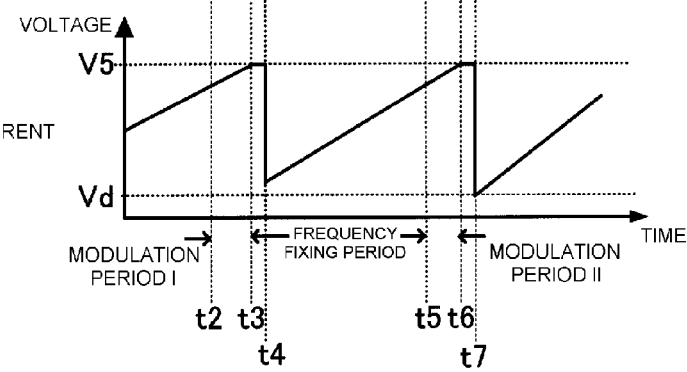

The reference voltage signal Sd from the overcurrent level setting circuit 50 shown in FIG. 4E has a value of $$Vd = I7 \times R4 \quad \quad (V)$$

at the timings t4 and t7 immediately after the MOSFET 17 is turned on, and from there becomes a continuously rising voltage signal that rises at a gradient proportional to I1/C1 (V/s).

The voltage signal Sb (a trapezoidal wave signal) in the oscillator 34 is such that a constant voltage value V5 is maintained from timings t2 and t5 at which charging periods finish and modulation periods I and II start, as shown in FIG. 4B. Because of this, it is not possible to also generate a signal maintaining a continuously rising gradient in the oscillator 34 during the modulation periods I and II. As opposed to this, the slope voltage signal Sa from the slope compensation circuit 35 has a continuously rising gradient during the period for which the oscillating signal Dmax is at an H level, as heretofore described. Consequently, the overcurrent protection reference voltage signal Sd generated based on the slope voltage signal Sa is a signal that also increases at a continuously rising gradient throughout the modulation periods I and II.

When the output voltage of the switching power supply is controlled to be constant, the on-state duration of the switch signal Sout is shorter the higher the input voltage from the AC input 1, and longer the lower the input voltage. Therefore, by a voltage proportional to the slope voltage signal Sa, which is proportional to the on-state duration of the switch signal Sout, being added to the constant overcurrent reference voltage (=I7×R4, corresponding to the voltage of the reference power supply V3 of the circuit shown in FIG. 6), the voltage of the reference voltage signal Sd is high in an overcurrent condition when the input voltage is low (the on-state duration is long), while the voltage of the reference voltage signal Sd is low in an overcurrent condition when the input voltage is high (the on-state duration is short).

Consequently, input voltage correction is carried out on the overcurrent reference voltage by this operation of the overcurrent level setting circuit 50, and it is possible to correct fluctuation occurring in the peak current of the MOSFET 17 when carrying out overcurrent protection.

In this way, according to the switching power supply device of embodiments of the invention, it is possible to provide the control IC 8, which has a frequency modulation function using a modulation period (idle period), with an advantage of correcting the input voltage with respect to the peak current of the MOSFET 17 when carrying out overcurrent protection.

The heretofore described MOSFET 17 has been used as one example of a switching element, and may be replaced with a device such as an IGBT (Insulated Gate Bipolar Transistor) or bipolar transistor.

The above description shows simply the principle of embodiments of the invention. Furthermore, a large number of modifications and changes are possible for those skilled in the art and, the invention not being limited to the exact configuration and application heretofore shown and described, all corresponding modification examples and equivalents are seen as being within the range of the invention according to the attached claims and equivalents thereof.

REFERENCE NUMERALS AND SIGNS LIST

1 AC input
2 Transformer
3, 5, 10, 13, 20 Capacitor
4 Diode bridge
6, 19 Diode
7 Current limiting resistor
8 Control IC
9 Thermistor
11, 23, 24 Resistor
12 Sense resistor
14 Backflow preventing diode
15 Auxiliary winding
16 Primary winding
17 MOSFET
18 Secondary winding
21 Photocoupler
22 Shunt regulator
25 Load
31 Start-up circuit (Startup)
32 Low voltage malfunction prevention circuit (UVLO)
33 Internal power supply (5VReg.)
34 Oscillator (OSC)
35 Slope compensation circuit
36 FB comparator
37 One-shot circuit
38 RS flip-flop
39, 41, 46, 51 OR gate
40 AND gate
42 Drive circuit (OUTPUT)
43 Level shift circuit (Level Shift)
44 IS comparator
45 OCP comparator
47 Current source
48 LAT comparator
49 Latch circuit
50 Overcurrent level setting circuit
Dmax Oscillating signal
I1 to I5 Current source circuit
Sa Slope voltage signal
Sb, $V_{SAW}$ Voltage signal
Sc Output signal
Sd Reference voltage signal
Sout Switch signal
T Transformer
V1 to V6 Reference power supply
Vcc Power supply voltage

What is claimed is:

1. A switching power supply device control circuit, being a control circuit of a flyback type switching power supply device that converts a voltage of an AC input into a predetermined direct current voltage by turning a switching element on and off and that supplies a voltage to a load, comprising:
a current detecting circuit, connected to the switching element, that converts a current of the switching element into a voltage signal;
an overcurrent protection circuit that detects an overcurrent with respect to the load based on the voltage signal converted by the current detecting circuit;
a voltage correction circuit that corrects a reference voltage signal to the overcurrent protection circuit in response to a change in the voltage of the AC input;
an oscillator circuit having a frequency modulating function whereby a switching frequency with respect to the switching element can be modulated; and
a slope compensation circuit that generates a slope compensation signal increasing monotonically in proportion to an on-state period of the switching frequency including a frequency modulation period set by the oscillator circuit, wherein the voltage correction circuit corrects the reference voltage signal in accordance with the slope compensation signal.

2. The switching power supply device control circuit according to claim 1, wherein the oscillator circuit generates a trapezoidal wave, and the switching frequency is modulated by a temporal length of a portion of the trapezoidal wave wherein voltage is constant being varied.

3. The switching power supply device control circuit according to claim 1, wherein the voltage correction circuit corrects the reference voltage signal by adding together a voltage proportional to the slope compensation signal and a constant voltage.

4. A switching power supply, being a flyback type switching power supply that converts a voltage of an AC input into a predetermined direct current voltage by turning a switching element on and off and that supplies a voltage to a load, comprising:
a current detecting circuit, connected to the switching element, that converts a current of the switching element into a voltage signal;
an overcurrent protection circuit that detects an overcurrent with respect to the load based on the voltage signal converted by the current detecting circuit;
a voltage correction circuit that corrects a reference voltage signal to the overcurrent protection circuit in response to a change in the voltage of the AC input;
an oscillator circuit having a frequency modulating function whereby a switching frequency with respect to the switching element can be modulated; and
a slope compensation circuit that generates a slope compensation signal increasing monotonically in proportion to an on-state period of the switching frequency including a frequency modulation period set by the oscillator circuit, wherein
the voltage correction circuit corrects the reference voltage signal in accordance with the slope compensation signal.

5. The switching power supply according to claim 4, wherein the oscillator circuit generates a trapezoidal wave, and the switching frequency is modulated by a temporal length of a portion of the trapezoidal wave wherein voltage is constant being varied.

6. The switching power supply according to claim 4, wherein the voltage correction circuit corrects the reference voltage signal by adding together a voltage proportional to the slope compensation signal and a constant voltage.

\* \* \* \* \*